Dec. 27, 1927. 1,653,808
C. P. LAMB
MACHINE FOR FORMING AUGER BITS
Filed Jan. 29, 1924 3 Sheets-Sheet 2
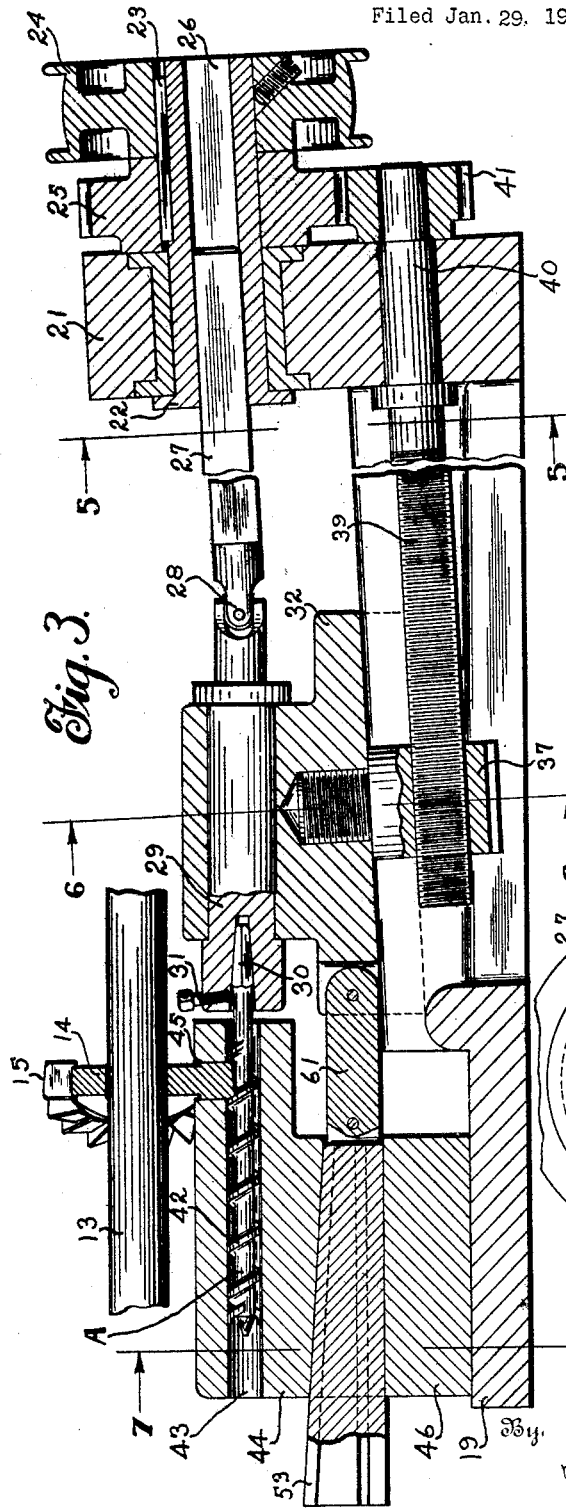
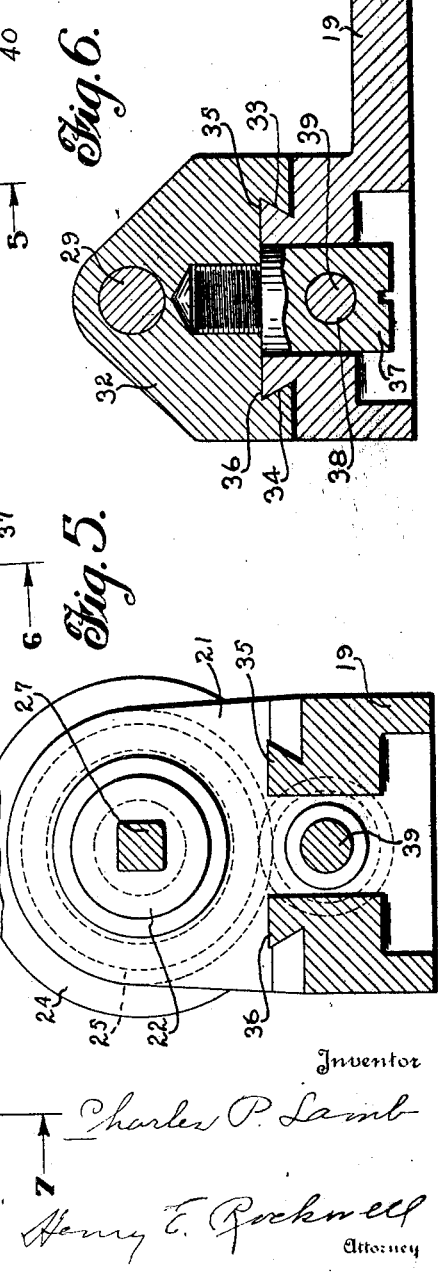
Inventor
Charles P. Lamb
By
Henry E. Rockwell
Attorney Dec. 27, 1927.  
C. P. LAMB  
1,653,808  
MACHINE FOR FORMING AUGER BITS  
Filed Jan. 29, 1924  
3 Sheets-Sheet 3
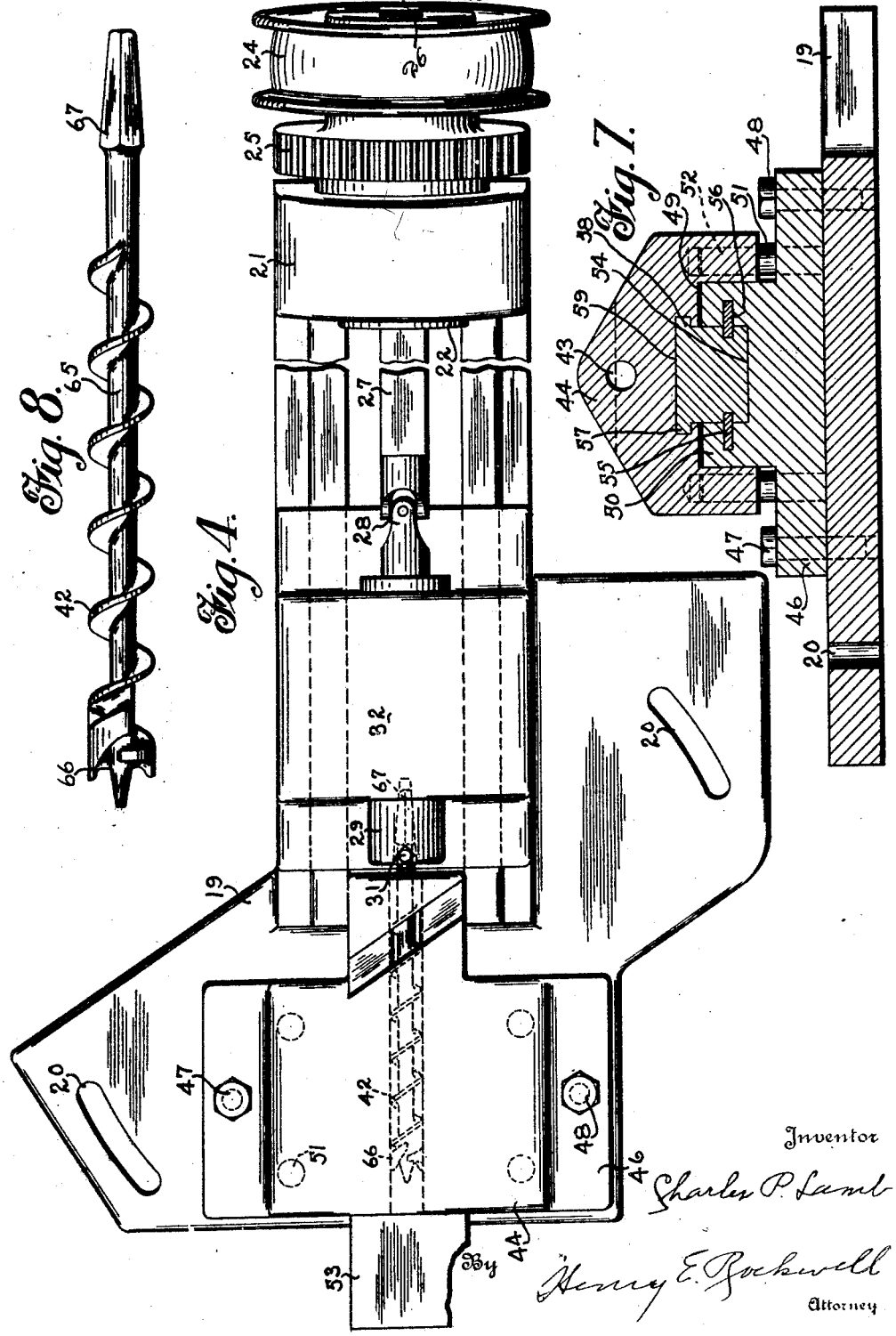
Inventor  
Charles P. Lamb  
By Henry E. Rockwell  
Attorney Patented Dec. 27, 1927.

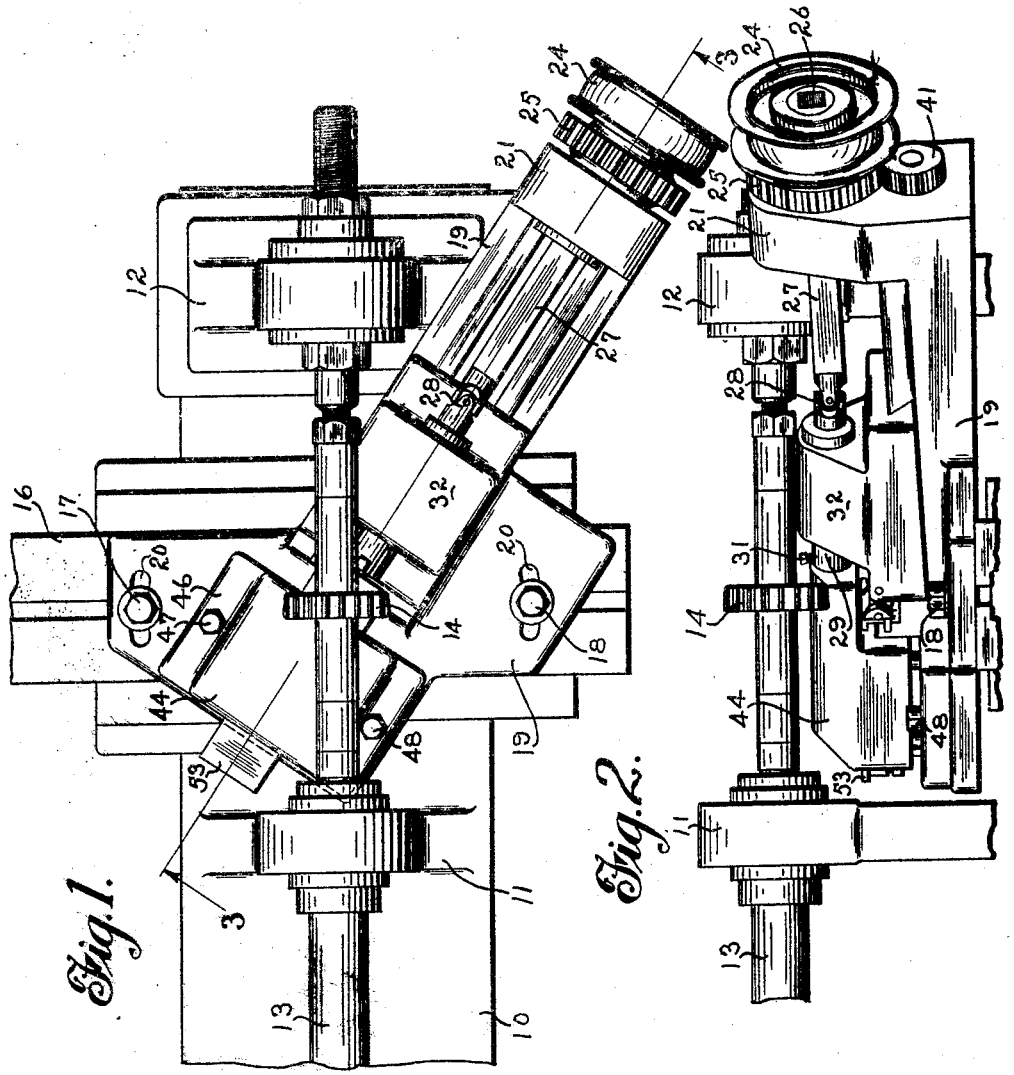

1,653,808

UNITED STATES PATENT OFFICE.

CHARLES P. LAMB, OF WEST HAVEN, CONNECTICUT, ASSIGNOR TO WINCHESTER REPEATING ARMS COMPANY, OF NEW HAVEN, CONNECTICUT.

MACHINE FOR FORMING AUGER BITS.

Application filed January 29, 1924. Serial No. 689,336.

This invention relates to auger bits, and more especially to a new and improved machine and a novel method for forming or shaping such bits.

More specifically my improvements relate to the forming of auger bits having a solid central spindle or core which is tapered from the shank toward the head of the bit. In carrying out my improved process I propose to make use of a cutter of a suitable type, such as a milling cutter, and to so support and control the blank from which the bit is to be made that this blank is moved longitudinally, is rotated, and is moved toward the cutter during the cutting operation. I prefer, also, to so arrange my improved machine that the cutter operates at an angle to the longitudinal axis of the bit, the angle being that of the helix or twist of the finished bit.

One object of my invention is to provide a new and improved process for forming auger bits.

Another object of my invention is to provide a new and improved machine in which auger bits provided with a solid tapered core or spindle may be expeditiously and economically formed.

Still another object of my invention is to provide a machine for forming auger bits such that while the cutting or forming operation is being performed, relative longitudinal, rotative, and approaching movements will be automatically produced between the cutter and the bit blank.

A further object of the invention is to provide in the form of an attachment for an ordinary milling machine, a machine for supporting and controlling a bit blank relatively to the milling cutter, such that the blank will be properly shaped or formed into the finished bit during the operation of the machine.

A still further object of the invention is the provision of a machine for completely shaping the bodies of auger bits with a solid tapered core so that no hand work will be required to complete the operation.

To these and other ends the invention consists in the novel features and combination of steps to be hereinafter described and claimed.

In the accompanying drawings:

Fig. 1 is a top plan view of a machine for forming auger bits, embodying my improvements;

Fig. 2 is a side elevational view of the same;

Fig. 3 is a section on line 3—3 of Fig. 1;

Fig. 4 is a top plan view of the fixture or attachment;

Fig. 5 is a sectional view on line 5—5 of Fig. 3;

Fig. 6 is a sectional view on line 6—6 of Fig. 3;

Fig. 7 is a sectional view on line 7—7 of Fig. 3, and

Fig. 8 is a side view of the finished bit as it is formed by my improved process and machine.

In the drawings illustrating my invention, I have shown a milling machine of the usual or any preferred type, comprising a base 10 having standards 11 and 12 rising therefrom in which is rotatably supported a shaft 13 carrying a milling cutter 14. It will be understood that the particular form of cutting means or of the milling machine used, may be varied if desired without departing from the principles of the invention, although in practice I prefer to taper slightly the cutting edge 15 of the cutter so that the sections of the central core of the bit will be slightly tapered. However, this is not absolutely essential to the invention as a bit with a solid core which generally tapers from the shank toward the head may be formed by a cutter having the usual cylindrical cutting edge.

The milling machine shown is provided with a slide 16 upon which I propose to mount my improved attachment, although it will be understood that my improvements are not limited to an attachment for a milling machine but on the contrary the entire mechanism may be incorporated in an integral structure if desired. Upon the slide 16 is mounted by means of the bolts 17 and 18 a base-plate 19 which supports the mechanism for holding and controlling the bit blank during the cutting operation. The bolts 17 and 18 are designed to pass through slots 20 in the base-plate so that the proper adjustment of the mechanism may be secured.

At one end of the base-plate 19 is arranged a standard 21 which, as shown in Fig. 3, is inclined forwardly at its upper end at a slight angle for a purpose to be hereinafter described. Rotatably mounted in the standard 21 is a sleeve or hollow shaft 22 which extends at right angles to the face of this standard, so that the sleeve is also inclined slightly relatively to the base-plate and to the shaft 13 of the cutter. Upon the outer end of this sleeve is keyed at 23 a driving pulley 24 which may be connected with any suitable source of power. Between the pulley 24 and the standard 21 a gear 25 is also secured to the sleeve 22 by means of the key 23.

The sleeve 22 is provided with a polygonal or square opening 26 in which is slidably mounted a shaft 27 of similar shape. The end of this shaft is connected by a universal joint 28 to the blank holding means in the form of a chuck 29, in the socket 30 of which the shank of the bit blank may be secured by means of a screw 31.

The chuck 29 is rotatably mounted in a carrier block 32, slidably mounted upon the bed. At its lower side the block 32 is dovetailed as shown at 33 and 34, in Fig. 6, to fit the guideways 35 and 36, formed upon the base-plate 19. These guideways are inclined upwardly toward the rear of the base-plate or toward the standard 21, as clearly shown in Fig. 3, so that when the chuck carrier block 32 is moved rearwardly by means to be described hereinafter, it will move up the inclined guideways so that the knuckle of the universal joint 28 will move in the direction of the bore 26 of the sleeve 22, the inclination of this sleeve and of the guideways 35 and 36 being equal. It may be noted that the chuck 29 is mounted horizontally in the carrier block 32 or parallel to the cutter shaft 13 so that while the chuck is, of course, moved upwardly or toward the cutter shaft, as the carrier block 32 is moved rearwardly it is always maintained in a position parallel to the shaft of the cutter.

A nut 37 is secured to the lower face of the carrier block 32 and projects downwardly between the guideways 35 and 36, where it is provided with a threaded bore 38 which receives a threaded shaft 39 rotatably mounted at 40 in the standard 21. The shaft 39 is mounted in an inclined position, the inclination being the same as that of the guideways 35 and 36 and the sleeve 22. Upon the end of this shaft is secured a gear 41 which meshes with the gear 25, previously referred to, so that when power is applied to the pulley wheel to rotate the sleeve 22, shaft 27, chuck 29 and the blank A held in the chuck, the shaft 39 will be rotated and by means of its threaded connection with the nut 37, the carrier block will be drawn rearwardly toward the standard 21 so as to move the blank longitudinally relatively to the cutter at the same time that it is being rotated. The shafts 27 and 39 will, of course, be rotated at proper relative speeds so that the combined longitudinal and rotary movements described will properly form the twist or helix 42 on the blank. It may here be stated that the blank may be roughly formed by forging or other suitable operations with the twist or helix 42 prior to its being placed in my improved machine, although this is not necessary as a solid or unformed blank may be employed if desired. It will, of course, be obvious, however, that if the blank is roughly formed prior to its being operated upon by my improved machine, the cutting operation to be performed therein will be greatly lessened.

In order to form a central tapering core upon the bit which gradually decreases in diameter from the shank toward the head, I have provided means for producing a relative approaching movement between the cutter and bit during the cutting operation. I prefer to mount the cutter upon a relatively fixed shaft, as shown, and so support the bit that it may be moved in a direction toward the shaft. For this purpose the bit blank A is supported in the bore 43 of a supporting block 44. The blank is somewhat loosely received in the bore 43 so that it may readily be rotated and moved longitudinally within this bore. The block 44 is recessed at 45, the recess communicating with the bore 43 to permit the cutter 14 to enter this bore and make cutting engagement with the blank.

The block 44 is supported from a second block 46 which in turn rests upon the base-plate 19 and is bolted thereto by means of the bolts 47 and 48. As shown in Fig. 7, the block 44 is channel shaped, as at 49, upon its lower side and is arranged to fit over an upstanding part 50 on the block 46. Secured in the last named block are bolts or pins 51 which extend upwardly and are loosely received in openings 52 in the supporting block 44, to permit the latter to move upwardly relatively to the supporting block, while at the same time restraining it from relative longitudinal movement.

A wedge shaped slide 53 is mounted in a recess 54 in the part 50 of the block 46 and is slidably retained in place in this recess by means of the keys 55 and 56. This wedge is, as shown in Fig. 7, slidably engaged with the supporting block 44 by the provision of guiding lugs 57 and 58 formed at the edges of the wedge and fitting in a complementally shaped guide channel 59 in the block. The upper surface of the wedge, as shown in Fig. 3, is inclined upwardly and forwardly as is also the guide channel in the block 44 in which are fitted the lugs 57 and 58 of the wedge. The wedge 53 is secured to the chuck carrier block 32 by means of a link 61 pivoted at one end to the block and at the other to the wedge. It will be apparent that as the carrier block 32 is drawn toward the right in Fig. 3, the wedge 53 will also be drawn toward the right to move the supporting block 44 and the bit blank toward the cutter shaft, so as to cause the cutter to make a deeper cut as the head of the bit is approached, thus causing the central core or spindle to be formed with a taper or with a diameter gradually decreasing toward the bit head.

It will, of course, be understood that the wedge 53 is properly shaped so that the vertical movement imparted to the block 44 will conform to that imparted to the carrier block 32, by its movement rearwardly on the inclined guideways 35 and 36, so that the chuck and the bit will be maintained at all times in a horizontal position, parallel to the plane of the shaft 13 of the milling cutter. The operation of the device is as follows:

A bit blank which may have been roughly formed by forging or the like, so that the desired helical twists and flutes are already outlined upon it, or a bit blank in solid form is inserted into the chuck opening and secured in place by means of the screw 31. The machine is properly adjusted so that the angle between the cutter and the longitudinal axis of the blank will be the same as that of the helical flutes formed or to be formed upon the blank. The machine is then set into operation, the cutter shaft 13 being, of course, rotated at a relatively high speed by a suitable means (not shown). The pulley 24 is connected with any suitable source of power and upon its rotation will cause the chuck, and therefore the bit blank, to rotate beneath the cutter and at the same time to be moved longitudinally by means of the rotation of the threaded shaft 39 through the gears 41 and 25. These simultaneous rotative and longitudinal movements will cause the bit blank to be traversed by the cutter over a helical path so that the proper twist or helix will be cut thereon. At the same time, the movement of the block 32 toward the right in Fig. 3, causes a like movement of the wedge 53 and moves the block 44 together with the bit blank toward the shaft 13 and cutter 14, at the same time that the chuck is being moved vertically toward the shaft on account of the block 32 riding upwardly on the inclined ways 35 and 36. This will cause a relative approaching movement between the cutter and the longitudinal axis of the blank so that a deeper cut will be made toward the bit head and the solid central core of the finished bit will be caused to taper in that direction.

As clearly shown in Fig. 8, the core 65 of the finished bit is smaller adjacent the head 66 than adjacent the shank 67. The core of the bit between any two adjacent turns of the helical twist 42 will be tapered, as shown in Fig. 8, as I have chosen to use a cutter provided with a slightly tapered cutting edge. It is entirely practical, however, to use a cutter with a cylindrical cutting edge in my improved machine, and with such a cutter a bit may be formed the core of which will be generally tapered from the shank toward the head, although the sections thereof between any two adjacent turns of the helical twist will be cylindrical rather than conical, as is the case in the present form.

When the bit is removed from the machine, the head 66 and the cutting edges formed thereon could be finished in a suitable manner.

While I have shown and described some preferred embodiments of my invention and a preferred method of carrying out the steps in my improved process, I do not wish to be limited to all the details shown nor to the precise steps described, nor to the order of carrying out these steps, but on the contrary my invention is capable of modification and variation without departing from the spirit of the invention and from the scope of the appended claims.

What I claim is:

1. In a machine for cutting auger bits, a horizontal frame, a rotary cutter above said frame, the axis of said cutter being horizontal, an inclined way on the frame, a work chuck mounted to rotate and move along said inclined way, said work chuck being adapted to support a bit blank with its axis horizontal, a work support on said frame, a wedge member movably mounted below the work support, said work chuck and work support engaging opposite ends of the blank and by their movement towards the cutter moving the ends of the blank substantially equal distances to retain the blank always in a parallel position, but feeding the blank nearer the cutter as the blank is moved along.

2. In a machine for cutting auger bits, a horizontal frame, a rotary cutter above said frame, the axis of said cutter being horizontal, an inclined way on the frame, a work chuck mounted to rotate and move along said inclined way, said work chuck being adapted to support a bit blank with its axis horizontal, a work support on said frame, means for moving the work support towards and away from the cutter, said chuck and work support engaging opposite ends of the blank and by their movement towards the cutter moving the ends of the blank substantially equal distances to retain the blank always in a parallel position, but feeding the blank nearer the cutter as the blank is moved along.

3. In a machine for cutting auger bits, a horizontal frame, a rotary cutter above said frame, the axis of said cutter being horizontal, an inclined way on the frame, a work chuck mounted to rotate and move along said inclined way, said work chuck being adapted to support a bit blank with its axis horizontal, means for rotating the chuck including a rotatably and slidably mounted shaft pivotally connected to the chuck and having its axis inclined relatively to the chuck axis, a work support on said frame, means for moving the work support towards and away from the cutter, said chuck and work support engaging opposite ends of the blank and by their movement towards the cutter moving the ends of the blank substantially equal distances to retain the blank always in a parallel position, but feeding the blank nearer the cutter as the blank is moved along.

4. In a machine for cutting auger bits, a horizontal frame, a rotary cutter above said frame, the axis of said cutter being horizontal, an inclined way on the frame, a work chuck mounted to rotate and move along said inclined way, said work chuck being adapted to support a bit blank with its axis horizontal, a work support on said frame, and a member movably mounted below said work support having an inclined surface to effect movement of the support, said surface being inclined oppositely to that of the way, said chuck and work support engaging opposite ends of the blank and by their movement towards the cutter moving the ends of the blank substantially equal distances to retain the blank always in a parallel position, but feeding the blank nearer the cutter as the blank is moved along.

5. In a machine for cutting auger bits, a horizontal frame, a rotary cutter above said frame, the axis of said cutter being horizontal, an inclined way on the frame, a carrier mounted to move along said inclined way, a chuck mounted in said carrier, said chuck being adapted to support a bit blank with its axis horizontal, means for rotating the chuck, a work support on said frame, means for moving the work support towards and away from the cutter, said chuck and work support engaging opposite ends of the work and by their movement towards the cutter moving the ends of the blank substantially equal distances to retain the blank always in a parallel position, but feeding the blank nearer the cutter as the blank is moved along.

6. In a machine for cutting auger bits, a horizontal frame, a rotary cutter above said frame, the axis of said cutter being horizontal, an inclined way on the frame, a carrier mounted to reciprocate on said inclined way, a chuck rotatably mounted in said carrier, said chuck being adapted to support a bit blank with its axis horizontal, means for rotating said chuck, a work support on said frame, means for moving the work support towards and away from the cutter, and a connection between said carrier and said means for moving the work support, said chuck and work support engaging opposite ends of the blank and by their movement towards the cutter moving the ends of the blank substantially equal distances to retain the blank always in a parallel position, but feeding the blank nearer the cutter as the blank is moved along.

7. In a machine for cutting auger bits, a horizontal frame, a rotary cutter above said frame, the axis of said cutter being horizontal, an inclined way on the frame, a work chuck mounted to rotate and move along said inclined way, said chuck being adapted to support a bit blank with its axis horizontal, a shaft rotatably and slidably mounted on the frame having its axis inclined so as to be parallel to the way and oblique to the axis of the chuck and connected to the chuck to rotate the same, a work support on said frame, means for moving said work support towards and away from the cutter, said chuck and work support engaging opposite ends of the blank and by their movement towards the cutter moving the ends of the blank substantially equal distances to retain the blank always in a parallel position, but feeding the blank nearer the cutter as the blank is moved along.

8. In a machine for cutting auger bits, a horizontal frame, a rotary cutter above said frame, the axis of said cutter being horizontal, an inclined way on the frame, a work chuck mounted to rotate and move along said inclined way, said chuck being adapted to support a bit blank with its axis horizontal, a member rotatably mounted on the frame, a shaft slidably and non-rotatably connected to said member and connected to said chuck, means to rotate said member, and synchronously operated means to move the chuck along its inclined path, a work support on said frame, means for moving said work support towards and away from the cutter, said chuck and work support engaging opposite ends of the blank and by their movement towards the cutter moving the ends of the blank substantially equal distances to retain the blank always in a parallel position, but feeding the blank nearer the cutter as the blank is moved along.

9. In a machine for cutting auger bits, a horizontal frame, a rotary cutter above said frame, the axis of said cutter being horizontal, an inclined way on the frame, a carrier mounted to reciprocate on said inclined way, a work chuck mounted to rotate on said carrier, said chuck being adapted to support a bit blank with its axis horizontal, a member rotatably mounted on the frame, a shaft slidably and non-rotatably connected to said member and connected to said chuck, means to rotate said member, and means actuated by said member for moving said carrier along the inclined way, a work support on said frame, means for moving said work support towards and away from said cutter, said chuck and work support engaging opposite ends of the blank and by their movement towards the cutter moving the ends of the blank substantially equal distances to retain the blank always in a parallel position, but feeding the blank nearer the cutter as the blank is moved along.

10. In a machine for cutting auger bits, a horizontal frame, a rotary cutter above said frame, the axis of said cutter being horizontal, an inclined way on the frame, a carrier mounted to move along said inclined way, a work chuck rotatably mounted in said carrier, said chuck being adapted to support a bit blank with its axis horizontal, a member rotatably mounted on the frame, a shaft slidably and non-rotatably connected to said member and connected to said chuck, means to rotate said member, a second shaft driven by said member, said second named shaft being provided with threads, means on said carrier provided with complemental threads and engaging said threaded shaft, a work support on said frame, means for moving said work support towards and away from said cutter, said chuck and work support engaging opposite ends of the blank and by their movement towards the cutter moving the ends of the blank substantially equal distances to retain the blank always in a parallel position, but feeding the blank nearer the cutter as the blank is moved along.

11. In a machine for cutting auger bits, a horizontal frame, a rotary cutter above said frame, the axis of said cutter being horizontal, an inclined way on the frame, a carrier mounted to move along said inclined way, a work chuck mounted to rotate in said carrier, said chuck being adapted to support a bit blank with its axis horizontal, a member rotatably mounted on the frame, a shaft slidably and non-rotatably mounted on the frame, a shaft slidably and non-rotatably connected to said member and connected to said chuck, means to rotate said member, a second shaft driven by said member, said second named shaft being provided with threads engaging complemental threads in said carrier, a work support on said frame, a wedge member movably mounted below the work support, a connection between said wedge member and said carrier, said chuck and work support engaging opposite ends of the blank and by their movement towards the cutter moving the ends of the blank substantially equal distances to retain the blank always in a parallel position, but feeding the blank nearer the cutter as the blank is moved along.

12. In a machine for cutting auger bits, a horizontal frame, a rotary cutter above said frame, the axis of said rotary cutter being horizontal, an inclined way on the frame, a work chuck mounted to rotate and move along said inclined way, said work chuck being adapted to support a bit blank in a position with its axis inclined to the way but parallel to the horizontal plane passing through the axis of the cutter, and means for rotating said work chuck and moving it along said inclined way, whereby the blank will be moved towards the cutter with its ends passing through substantially equal distances to retain the blank always in a parallel position, but feeding the blank nearer the cutter as the blank is moved along.

In witness whereof, I have hereunto set my hand this 28th day of January, 1924.

CHARLES P. LAMB.